J. O. GOODWIN.
WINDING MACHINE.
APPLICATION FILED FEB. 23, 1917.

1,246,260.

Patented Nov. 13, 1917.
10 SHEETS—SHEET 3.

Inventor:
John O. Goodwin,
by Middleton Donaldson
Attys.

J. O. GOODWIN.
WINDING MACHINE.
APPLICATION FILED FEB. 23, 1917.

1,246,260.

Patented Nov. 13, 1917.
10 SHEETS—SHEET 4.

Inventor:
John O. Goodwin,
by Spear Middleton Donaldson Spear
Attys.

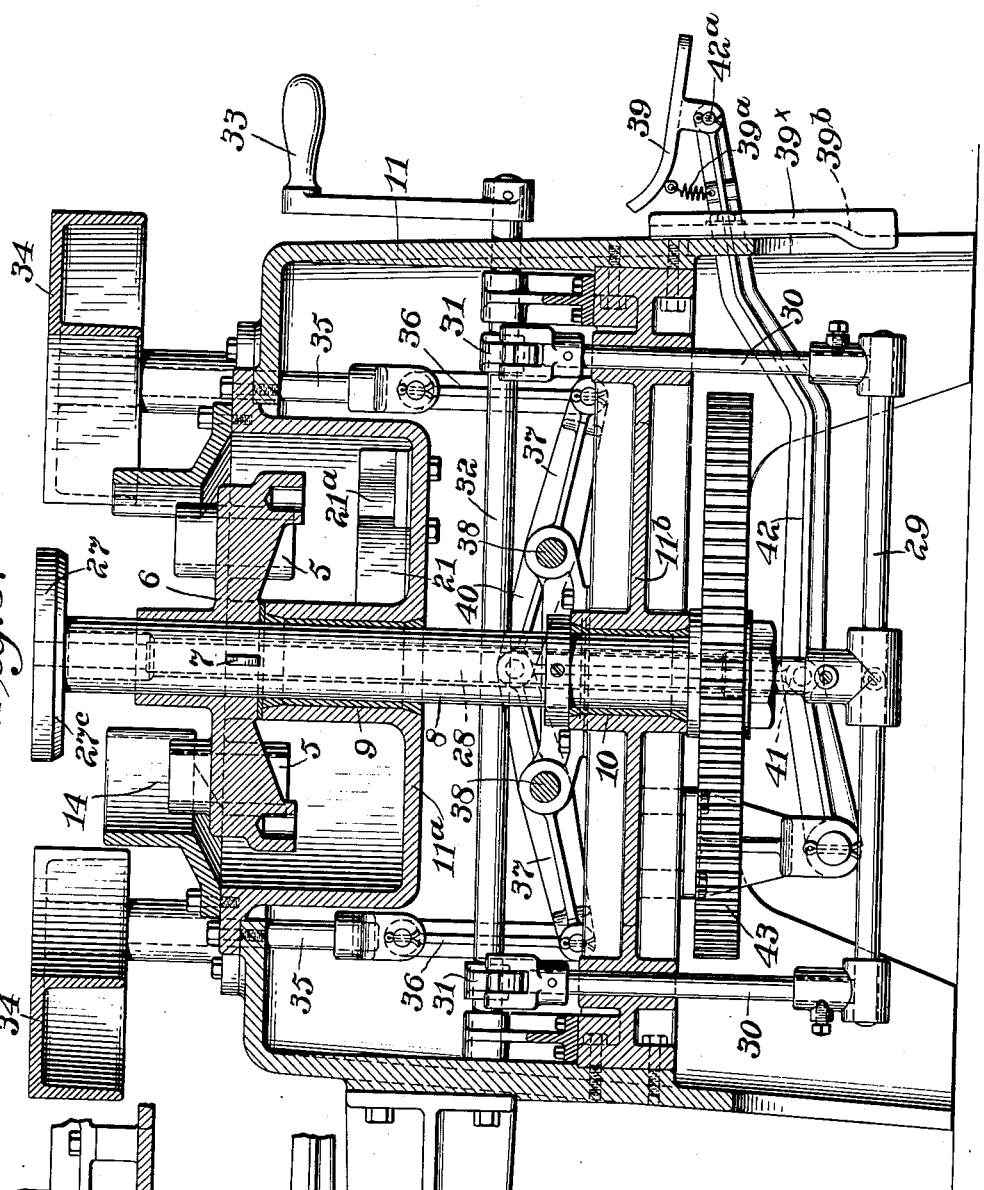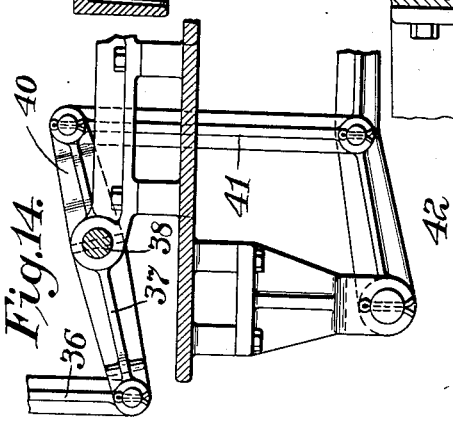

J. O. GOODWIN.
WINDING MACHINE.
APPLICATION FILED FEB. 23, 1917.

1,246,260. Patented Nov. 13, 1917.
10 SHEETS—SHEET 6.

Inventor:
John O. Goodwin,
by Offner Middleton Donaldson & Offner
Attys.

J. O. GOODWIN.
WINDING MACHINE.
APPLICATION FILED FEB. 23, 1917.
1,246,260.
Patented Nov. 13, 1917.
10 SHEETS—SHEET 7.
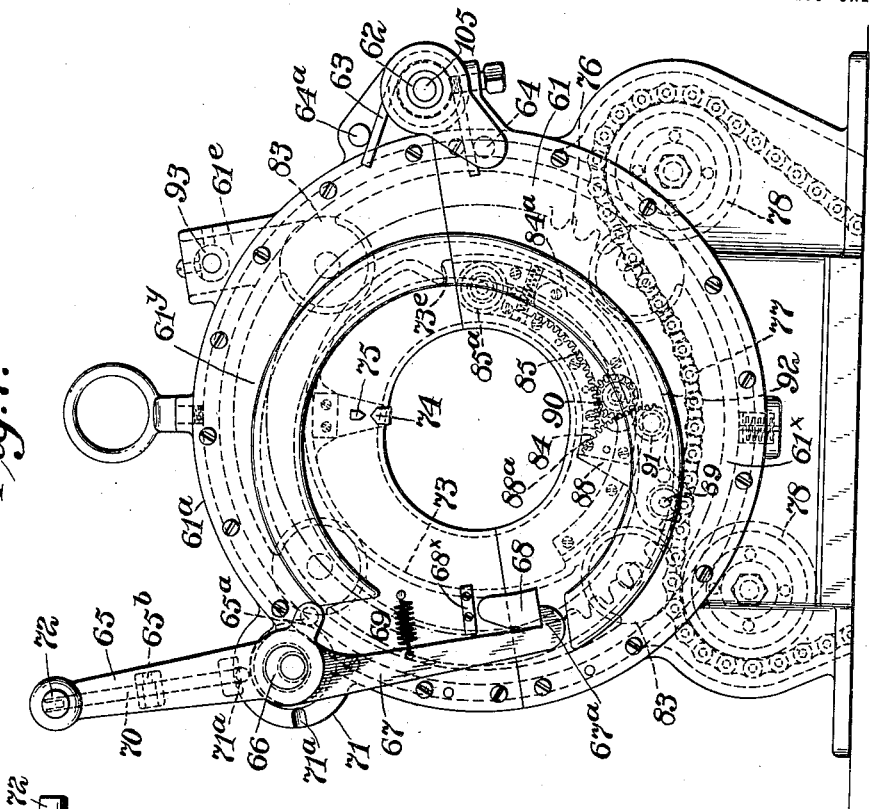
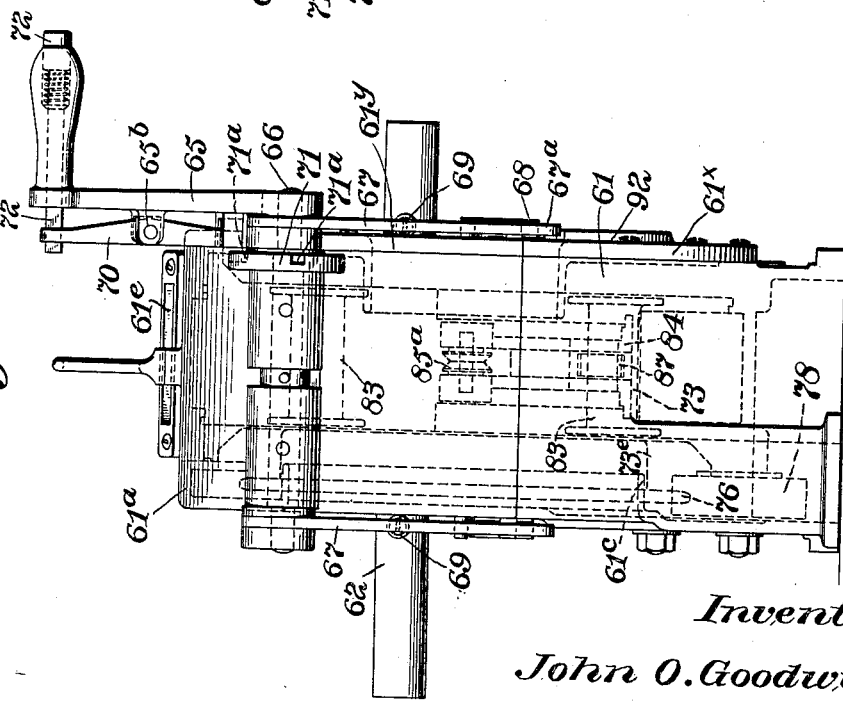
Inventor:
John O. Goodwin,
by Attys.

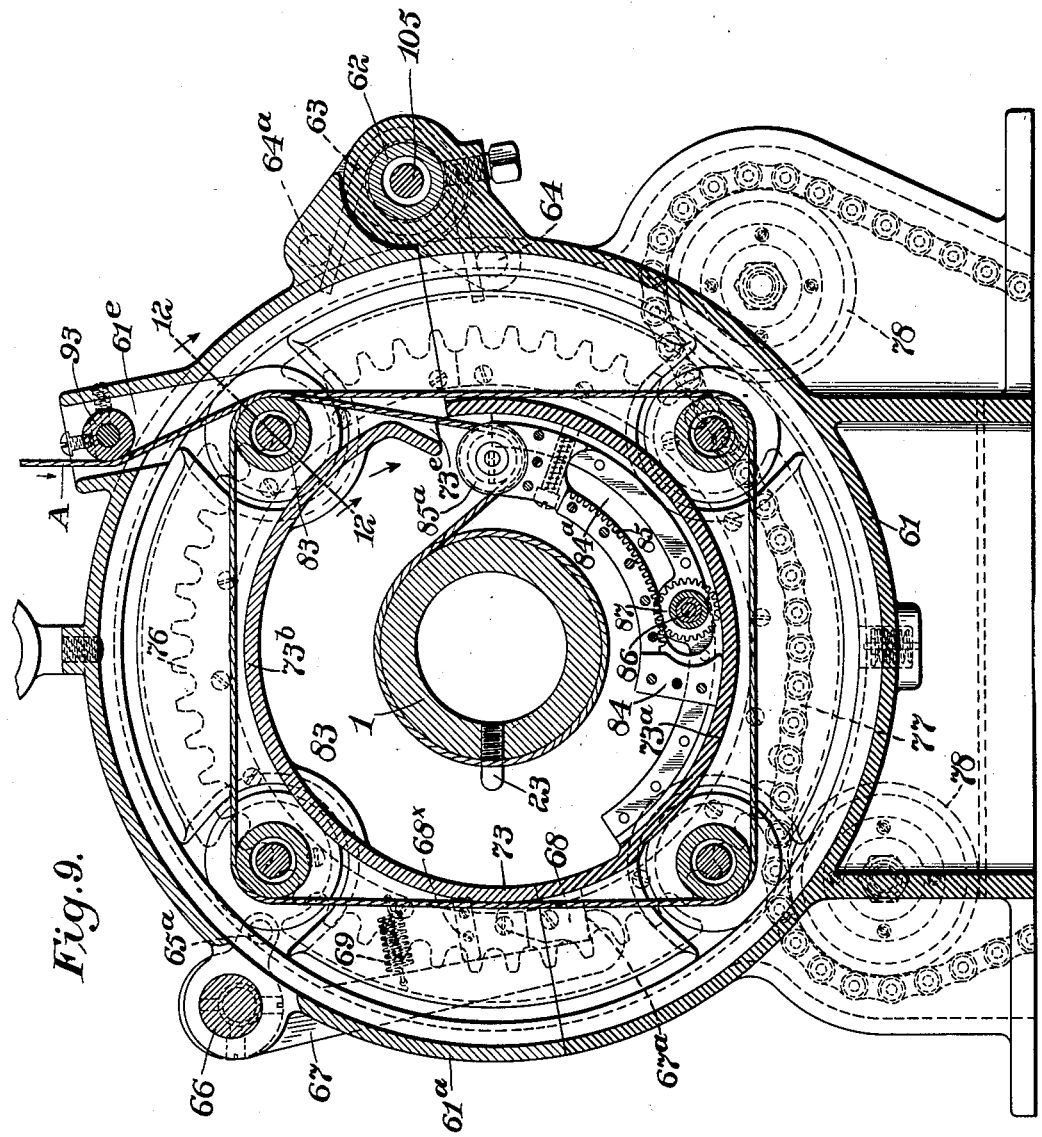

J. O. GOODWIN.
WINDING MACHINE.
APPLICATION FILED FEB. 23, 1917.
1,246,260.
Patented Nov. 13, 1917.
10 SHEETS—SHEET 9.
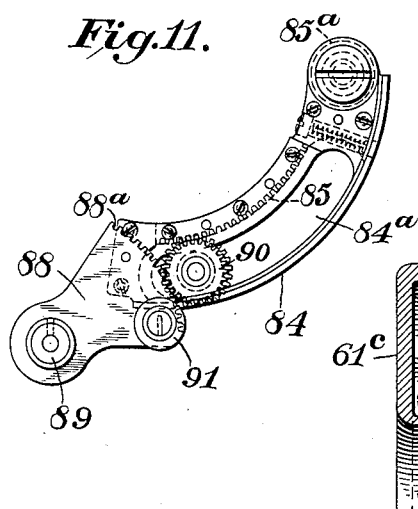
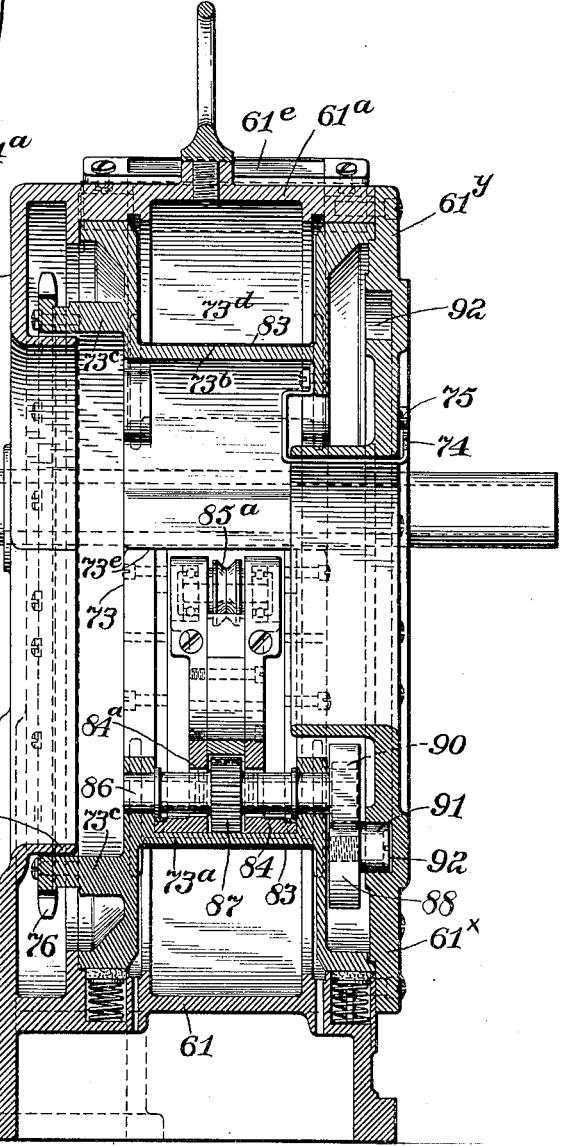
Inventor:
John O. Goodwin,
by Spear Middleton Donaldson & Spear
Att'ys.

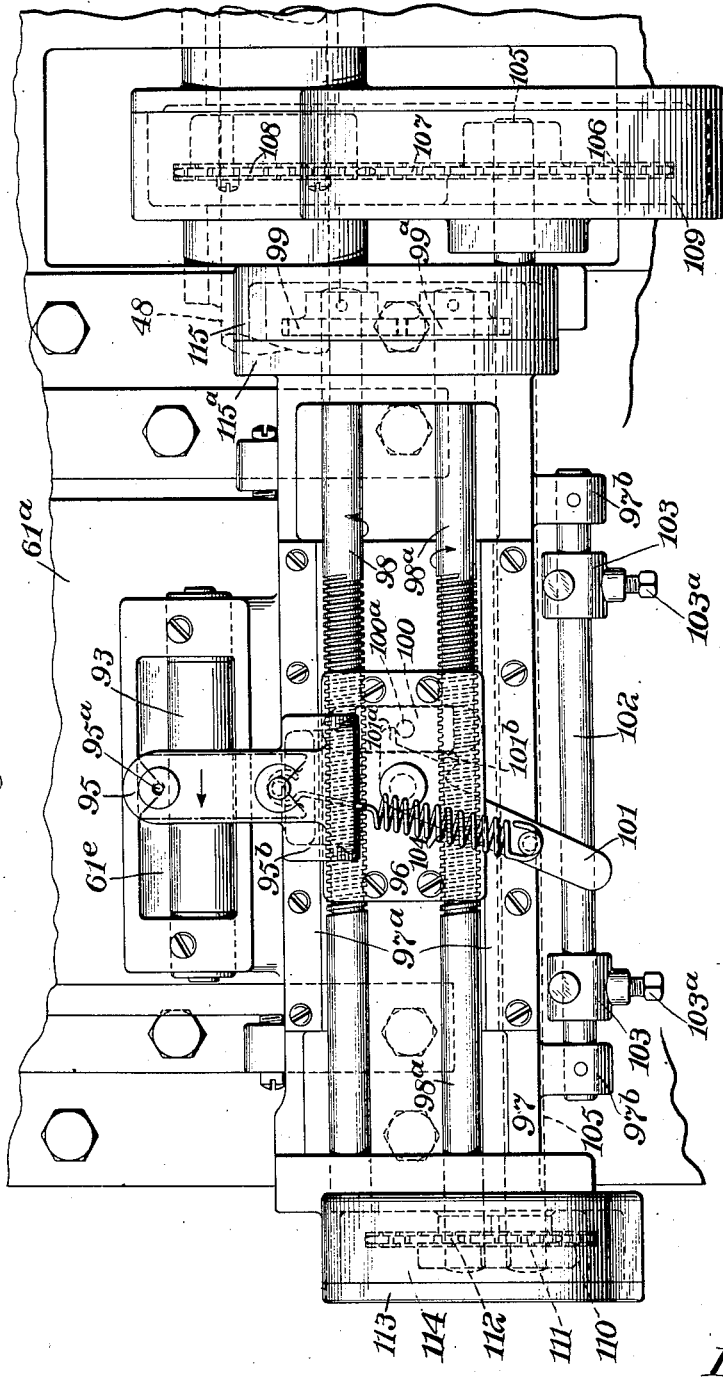

UNITED STATES PATENT OFFICE.

JOHN ORVILLE GOODWIN, OF AKRON, OHIO.

WINDING-MACHINE.

1,246,260.          Specification of Letters Patent.          Patented Nov. 13, 1917.

Application filed February 23, 1917. Serial No. 150,471.

*To all whom it may concern:*

Be it known that JOHN O. GOODWIN, a citizen of the United States, and resident of Akron, Ohio, have invented certain new and useful Improvements in Winding-Machines, of which the following is a specification.

My present invention relates to improvements in ring winding machines and is designed more especially for laying cord about an annular mandrel, or core, in the manufacture of cord carcases for pneumatic tires; but while I have, in the following specification, described my invention in connection with such tire manufacture, it will be understood that it is applicable to winding rings of any character and for whatever purpose desired.

In devising my present invention I have aimed to provide a machine which would dispense with the necessity of first winding the cord, or other material, upon a bobbin or reel, thereby greatly increasing the speed of the machine.

I have further sought to enable the winding material to be stored in compact form and to be wound upon the reel in orderly position and under uniform tension.

A further object in view was to provide means for accurately laying the cord upon the mandrel in a path varied from the curve generated by the relative velocities of the mandrel and reel, while at the same time driving both mandrel and reel at a constant rate of speed.

I have also aimed to produce a machine having various improved features of construction, looking to speed of operation, accuracy in work, and capability for easy manipulation and control.

The invention includes the novel features of construction and arrangement and combination of parts hereinafter described, my said invention being set forth in and defined by the appended claims.

An embodiment of my invention is illustrated in the accompanying drawings, in which—

Fig. 5 is a transverse vertical section on line 5—5 of Fig. 3.

Fig. 7 is an enlarged detail side elevation of the winding mechanism.

Fig. 8 is a front elevation of the same.

Fig. 9 is a vertical sectional view of the same.

Fig. 10 is a transverse vertical section through Fig. 9.

Fig. 11 is a detail view of the means for varying the laying of the cord.

Fig. 12 is a transverse sectional view on line 12—12 of Fig. 9.

Fig. 13 is a detail plan view of the automatic cord guiding means.

Fig. 14 is a fragmental detail of Fig. 5.

Figure 1:
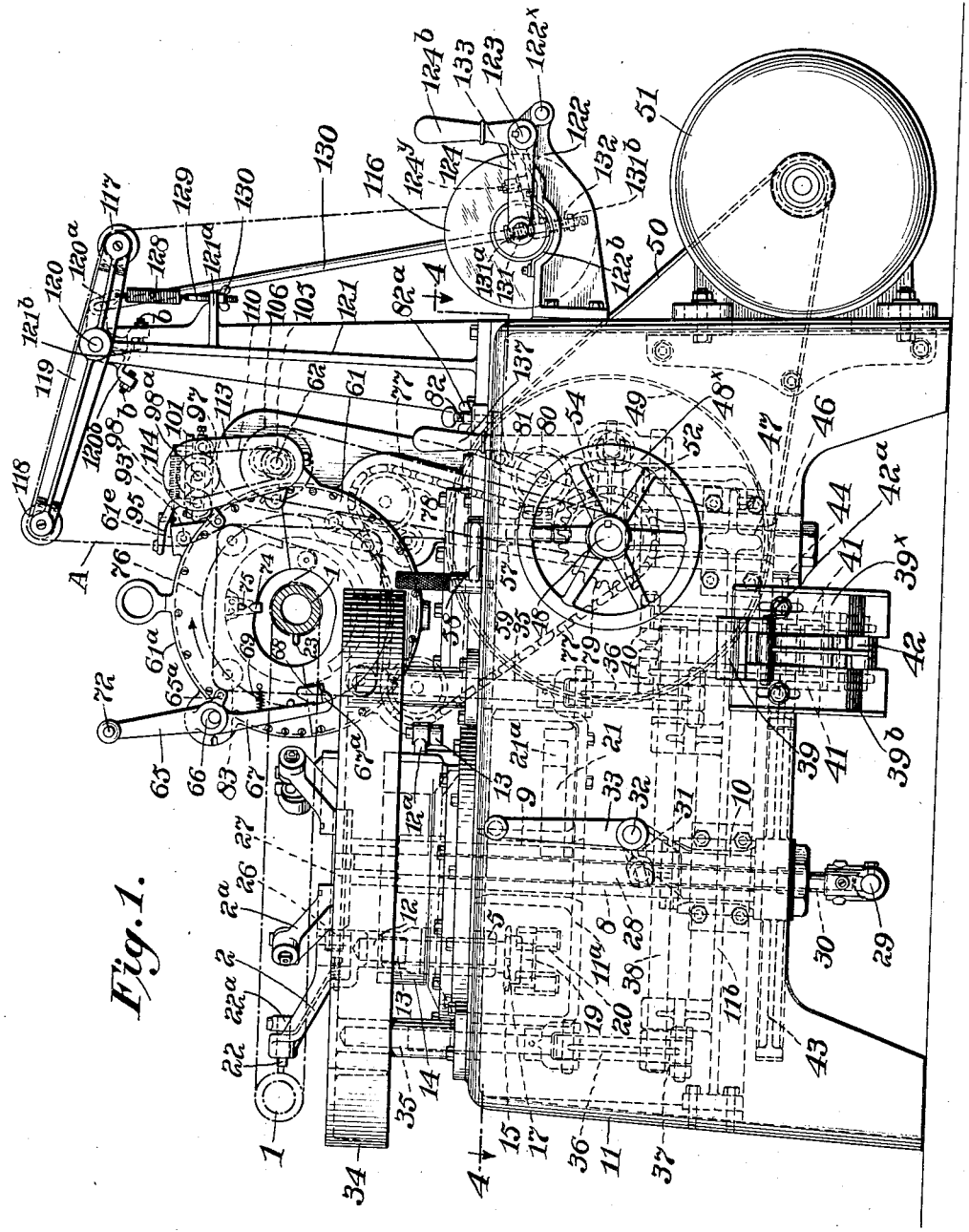
Figure 1 is a side elevation of the complete machine.

Referring more particularly to these drawings, the core, or mandrel, upon which the cords are wound, is indicated at 1 in Fig. 1, wherein it appears in full lines where it lies within the shuttle or winding device, and for its remaining part in dotted lines.

The precise character of the core forms no part of the present invention, and it may, therefore, be of any form desired, but for the manufacture of cord tires I prefer to use the core which forms the subject of Letters Patent of the United States No. 1,192,874, granted August 1st, 1916, to Walter R. Denman. The shuttle or reel, hereinafter described, is located at a fixed point in the machine and encircles the core during the winding operation, laying the cord thereon by its rotation while the core, or mandrel, is being revolved on its axis, and the shuttle or reel and shuttle race, which are of annular form, being capable of being opened to permit the insertion and removal of the core.

*Core supporting and driving means.*

As the shuttle race and shuttle or reel are of annular or ring form, the core supporting and driving means must be such as not to interfere with the operation of the shuttle and yet must be capable of supporting and rotating the core in a truly circular path, as any inequalities or unevenness of movement would cause the cord to be irregularly laid.

To accomplish this I provide a plurality of lever arms 2, 2$^a$, which are fast on the upper extremities of shafts 3 and 3$^a$, These shafts are journaled in bosses, or bearings 5 carried by a circular spider plate 6 non-rotatably connected by keys 7 with the upper portion of a tubular vertical shaft 8 journaled in bearings 9 and 10 carried by the parts 11$^a$ and 11$^b$ of the main frame 11. As the shaft 8 rotates the shafts 3 will be carried around with a circular orbital movement, carrying the core with them.

During the greater part of said orbital movement the arms extend radially outward in core holding position, but as they successively approach the shuttle they are swung inward to clear the winding mechanism and thereafter swung outward to reëngage the core.

To maintain the arms in their core holding positions, the shafts 3 and 3$^a$ are provided with rigidly attached cross arms 12 and 12$^a$ carrying anti-friction rollers 13 which bear against a concentric cam track or flange 14 suitably secured to the main frame. This cam track or flange is interrupted in proximity to the winding mechanism so as to allow the rollers to be disengaged to permit the arms to successively swing out of core engaging position. The cross arms should be of sufficient length to space their respective rollers sufficiently far apart to give firm support to the arms, and to avoid any contact between the rollers of adjacent core holding arms the cross arms are placed alternately at different elevations, cross arms 12 being elevated and cross arms 12$^a$ depressed, or lowered.

For the purpose of swinging the arms inwardly to clear the winding mechanism, the shafts 3 and 3$^a$ are provided at their lower ends with sprocket wheels 15 which are connected respectively by sprocket chains 16 with other sprocket wheels 17 journaled on studs 18 projecting downwardly from the under face of the spider plate between the shafts 3 and 3$^a$.

Fast on the hubs of sprocket wheels 17 are cross arms 19 carrying rollers 20. One of these rollers on each cross arm is designed, as the spider plate rotates, to enter a cam groove 21$^a$ in a member 21 secured to the bottom of frame member 11$^a$ (which is in the form of an oil trough or casing), and the entrance of the roller into, and its travel through the cam groove, causes the corresponding core holding arm to swing inward to enable it to clear the winding means, and to thereafter move outward to core engaging position. It will be understood that the rollers 20 are designed to coact with the cam groove 21$^a$ during the period that the rollers 12 and 12$^a$ are free from the wall or flange 14, or are traversing the space formed by the interruption of said wall.

The cam groove 21$^a$ and the cross arms and rollers 20 are so correlated that the cross arm approaches the entrance to the groove with one roller in advance of the other. The forward roller enters the groove and swings the cross arm, the other roller passing outside the member, and as said forward roller passes through the cam groove it swings the cross arm through an angle of 180 degrees, thus reversing the position of the rollers. The sprocket wheels 15 and 17 are so related that while the cross arms 19 are swinging through 180°, the core holding arms will swing through 360°, or, in other words, will be moved inward to clear the winding means and will continue to swing around until again brought into core holding position.

For the purpose of connecting the core to or holding it firmly on the core supporting and driving arms, I provide said arms with supplemental core engaging devices.

These comprise sliding socket pins, or plungers 22, guided in suitable slideways, or openings, in radial bosses formed on the outer ends of the arms 22$^a$, and having recesses in their outer ends to engage correspondingly located projections 23 on the inner circumference of the core.

Each of these plungers 22 is adjustably connected, as by means of screw threads and a locking screw, with a slide member 24 mounted to reciprocate in a guideway formed in the corresponding arm 2 or 2$^a$. A spring 25 interposed between the slide and its supporting arm, tends normally to hold the slide and socket plunger retracted.

Each slide member carries at its inner end a roller 26 which coöperates with a nonrotatable cam member 27 having a concentric portion 27$^a$ and a cut-away portion 27$^b$. As the arms 2 and 2$^a$ revolve, the rollers 26, bearing on the concentric portion 27$^a$ of the cam 27, hold the slides pressed outwardly against the tension of the springs and the socket pieces, or plungers 22, into engagement with the pins, or projections, of the core. When, however, a roller 20 reaches the cut-away portion 27$^b$ of the cam, the slide is permitted to move inwardly under the tension of its spring, withdrawing the socket piece, or plunger, 22, from engagement with the core projection so that the respective core supporting and driving arm is disconnected from the core and is free to be swung inward to clear the winding means in the manner hereinbefore described.

For the purpose of enabling the core to be removed and replaced, I mount the cam 27 upon a vertical rod 28, which extends through the tubular shaft 8 and has its lower end connected to a transverse rod or bar 29 linked by rods 30 to arms 31 on a rock shaft 32. This rock shaft is provided at a point accessible to the operator with a crank handle 33, by the operation of which the rod 28 and with it the cam 27, will be raised to clear all of the rollers 26, allowing the socket pieces or plungers 22 to be forced inwardly by the springs to disengage the core, whereupon it may be easily removed and replaced, it being understood that the core table is first raised to support the core before it is released from the arms.

The cores upon which pneumatic tires are made are extremely heavy and difficult to handle. For convenience in placing the cores in the machine, I provide a table 34 mounted upon vertical rods 35 slidably guided in the frame of the machine and connected at their lower ends by links or connecting rods 36 to lever arms 37 carried by a pair of crank shafts 38 journaled in the frame member 11$^b$. These shafts 38 carry lever arms 40 pinned to connecting rods 41, which are in turn pinned to a common foot-lever 42 fulcrumed on the frame of the machine, which is controlled by the foot-treadle 39.

The treadle or foot plate 39 is arranged to automatically lock the table in its elevated position and for this purpose it is pivotally mounted on the protruding end of lever 42 as indicated at 42$^a$, and its rear portion is connected therewith by a helical spring 39$^a$. Said rear end is adapted to coöperate with inclines 39$^b$ on a bifurcated plate member 39$^x$, through the bifurcation of which the lever 42 extends, said plate member being adjustably bolted to the machine frame as shown in Fig. 1. As the lever 42 is pushed downwardly by the treadle the spring draws the rear end of the treadle down and when this reaches the incline or shoulders 39$^b$ the lever will be locked in position.

A slight further downward movement allows the treadle to be rocked by the foot against the spring tension to release the lock and lower the table.

A core having been laid upon the table 34, operation of the foot treadle 42 through the connections above described will raise the table until the projections on the core are brought in line with the socket members or plungers 22, and thereafter these may be forced outwardly into engagement with the pins of the core by the lowering of the cam 27 by means of the hand lever 33. To facilitate the forcing out of the plungers 22 by the cam 27, said cam is provided on its lower face with an inclined, or beveled, portion 27$^c$ designed to coact with correspondingly beveled portions 26$^c$ on the rollers 26.

In removing the core from the arms the reverse operation takes place, to wit; the table is raised until it is in position to support the core, whereafter the socket members 22 are withdrawn.

For the purpose of driving the tubular shaft 8 and with it the spider and core supporting and driving arms heretofore described, said tubular shaft has keyed to the lower portion thereof a gear wheel 43 which meshes with an idle gear 44 mounted on a stub shaft 45. This idle gear in turn meshes with a gear 46 mounted for removal and replacement on the lower end of the vertical shaft 47 suitably journaled in the machine frame. Stub shaft 45, and with it gear 44, is also capable of removal and replacement.

Shaft 47 lies in the same vertical plane with a main drive shaft 48, which is provided with any suitable means for receiving power, as, for instance, belt pulley 49 designed to be driven by belt 50 from motor 51. Said shaft 47 carries at its upper end a beveled gear 52, which is designed to coöperate with a pair of opposed beveled gears 53$^a$ and 53$^b$ slidably mounted upon a feather key carried by said drive shaft 48, so that shaft 47 may be driven in opposite directions without reversing the motion of shaft 48 by simply causing one or the other of the beveled gears 53$^a$ and 53$^b$ to mesh with gear 52. These beveled pinions 53$^a$ and 53$^b$ are supported by a suitable lifting yoke 54 operated by a pitman 55 connected to a crank arm 56 on the lower end of a vertical rock shaft 57 to whose upper extremity is secured a hand lever 58. This hand lever carries a locating pin 59 which moves over a fixed sector 60 provided with three stop pin holes 60$^a$, 60$^b$ and 60$^c$, said holes being so positioned that when the pin is positioned in the central hole 60$^b$, the drive shaft 48 may revolve without corresponding motion of the shaft 47, thus allowing the core supporting and driving arms to remain stationary, while when the locating pin is in hole 60$^a$, shaft 47, and hence the core driving arms, will be rotated in one direction, and while with the pin positioned in hole 60$^c$, said parts will be driven in the opposite direction.

The gears 43 and 46 are so proportioned that the number of teeth in gear 43 divided by the number of teeth in gear 46 will leave a remainder of one, so as to prevent the convolution of cord laid by the shuttle at the end of one complete revolution of the core from being superimposed upon the preceding convolution.

*Winding means.*

For the purpose of winding the cord around the core as it is rotated by the instrumentalities above described I provide the following mechanism.

Encircling the core (when the same is held by the core rotating and driving arms) is an annular shuttle or reel supporting frame or raceway which comprises a lower semicircular section 61 suitably supported from the main frame of the machine and an upper complemental semi-circular section 61ª. This latter is hinged to the former by means of hinge pintle 62 so that the upper section may be swung upwardly or opened to allow the ring core to be placed in the winding position, which is shown in Figs. 1 and 9. Springs 63 surrounding the hinge pintle have opposite portions bearing against pins 64 and 64ª located respectively on the fixed and hinged sections of the raceway and tending to automatically open the hinged section when the locking means are operated to release the same.

For the purpose of closing and locking the hinged section I provide a handle arm 65 fast on a pin or shaft 66 eccentrically journaled in a suitable part of frame section 61ª, to the eccentric portion of which pin is pivotally connected on each side a latch arm 67 having a latch end 67ª adapted to engage a lug or projection 68 on the stationary frame section 61 and thus hold the hinged section in closed position against the tension of the spring 63, the swinging movement of latch arms 67 toward the sections being limited by stops 68ˣ.

Springs 69 connecting the latch arms 67 to the frame 61ª tend to draw said arms into locking position, which is shown in Figs. 1 and 9. Motion of the handle arm 65 to the right (Fig. 1) rotates the eccentric pin or shaft 66, which imparts a slight endwise movement to latch arms 67, thereby relieving the latch ends of frictional contact with the projections 68 and further movement of the handle arm 65 causes the latch arms to be swung outward away from projections 68 through lugs or pins 65ª on said handle arm and the opposite end of the shaft which contact with the latch arms. The upper frame section 61ª will then be swung open by springs 63. The handle arm 65 is retained against swinging and thus turning the eccentric pin on its axis, during this movement, through the provision of a latch lever 70 pivoted to a lug 65ᵇ on handle arm 65, and having one end adapted to engage a series of notches 71ª or recesses in a quadrant 71, the opposite arm of said lever 70 being controlled by a spring push pin 72.

In the closing of the hinged section 61ª and subsequent locking thereof the handle arm is first swung to the left, which movement provides greater leverage of the handle, due to the locking engagement of lever 70 with quadrant 71 and causes said hinged section 61ª, to be closed upon the fixed section 61 and thereupon said locking engagement being released by operation of the push pin, further movement of the handle arm removes the projection 65ª from contact with latch arm 67, allowing the latter to be drawn by its spring into locking engagement with projection 68, and through rotation of the eccentric pin, tends to draw the latch arm upward, resulting in clamping the hinged section tightly upon the stationary section.

Release of the push pin allows the handle arm 65 to be locked in this latter position through engagement of latch lever 70 with the proper notch of the quadrant.

Rotatably mounted within the shuttle frame or raceway is an annular shuttle 73 comprising a pair of semi-circular sections 73ª and 73ᵇ corresponding to the sections of the raceway and interlocking therewith, as shown in Fig. 10. One of these sections 73ᵇ carries a pointer 74 coöperating with a similar pointer 75 on the raceway to indicate when the line of division between the shuttle sections coincides with the line of division between the raceway sections to enable the opening of the raceway and shuttle for insertion of the core.

Projecting laterally from one side of the shuttle is an annular flange 73ᶜ, which carries an annular sprocket ring 76, housed within an overhanging part 61ᶜ of the shuttle frame or raceway.

Rotation is imparted to the shuttle through the engagement with this sprocket ring of a sprocket chain 77 passing over idle sprockets 78 (between which it engages with said ring,) and passing also around a drive sprocket 79 on drive shaft 48. Slack of the chain is taken care of by a roller 80 journalled in one arm of a bell crank lever 81, the other arm of which may be operated by a screw rod 82, provided with a lock nut 82ª.

The shuttle is of channel shape in cross-section as clearly shown in Fig. 10 and within the channel 73ᵈ thereof are journaled a plurality of spools 83, upon which the thread is wound and accumulates during the operation of winding it about the core and from which it is drawn as it is laid around the core, whereby I save the time and labor which has heretofore been required by the complete filling of the shuttle before the corewinding is begun.

In the laying of the cord upon the core or mandrel I have found that certain advantages in the resulting tire are gained by laying the cords in a path varying from the curve generated by compounding the uniform velocities of the core and shuttle. This I accomplish by the following described mechanism.

The shuttle section 73ª is provided with an arcuate guide concentric with the shuttle axis, within which is slidably mounted an arcuate frame 84, having an arc-shaped clearance opening 84ª and an outwardly facing rack 85 curved on an arc of a circle concentric with the axis of the shuttle. A shaft 86 suitably journaled in inwardly projecting flanges of the shuttle section 73ª and extending through said arc-shaped opening carries a gear 87, which meshes with said rack 85. A gear sector 88 is mounted to oscillate on a pin 89 carried by said shuttle section 73ª and its gear face 88ª meshes with a gear 90, carried by said shaft 86. This gear sector 88 carries a laterally projecting cam roller 91, which travels in a cam groove 92 in the inner face of the side plates 61ˣ and 61ʸ of the shuttle sections. The sliding frame 84 carries an idle guide spool 85ª, over which the cord passes just prior to its being laid around the core, and the cam groove 92 is so laid out that the segment will be rocked, and, through the gearing described, the slide reciprocated, carrying with it the guide roller 85ª in an alternately accelerated and retarded movement which will vary the curve on which the cord is laid.

It will be understood that at the commencement of the operation of laying the cord upon the core, the cord, indicated at A, is led through an elongated opening 61ᵉ in the raceway section 61ª, passing over the surface of a cylindrical guide roller 93 suitably journaled therein.

Thence the cord is passed around the spools 83, through the laterally elongated opening 73ᵉ in the shuttle whence it passes around the guide roller 85ª and has its ends secured to the core. As the shuttle is rotated in the manner hereinbefore described the cord is wound around the mandrel in the manner set forth, being drawn from the spools, but by reason of the spools being carried around with the shuttle the cord is wound upon the spools faster than it is laid upon the core until the entire length of cord requisite for the proper winding operation has been accumulated upon the spools.

In order that the cord may be fed to the shuttle or reel in such a manner that it may be drawn freely from the reel as it is laid about the core or mandrel, and all danger of tangling avoided I provide the following described cord guiding mechanism, which is mounted upon the hinged portion of the shuttle or reel frame and is therefore located in close relation to the shuttle for accurate guidance of the cord and is yet arranged so as not to interfere with the opening and closing of the hinged portion of the shuttle frame.

This mechanism comprises a guide arm 95 having an eye or opening 95ª through which the cord passes just prior to entering the passage 61ᵉ, the cord being conducted to said guide from supply means hereinafter described. This guide arm is formed as part of a member or casting 95ᵇ rigidly secured to a sliding carriage 96 guided in a slideway 97ª provided in a channel-shaped casting or member 97 which is supported from the shuttle section 61ª, as will hereinafter appear.

Extending longitudinally within this channel or slideway 97ª are a pair of parallel right hand threaded screw shafts 98, 98ª having at one end a pair of intermeshing gears 99, 99ª of equal size. The carriage 96 is provided with parallel passageways through which said screw shafts extend, and between said passageways, and communicating with the same is a transverse slot in which a block 100 is slidably mounted. This block is formed at each end with a semi-circular recess screw-threaded to correspond with the adjacent screw shaft and the width of the block is such that when one of its threaded recesses is in engagement with one screw shaft the opposite threaded recess is out of engagement with the other shaft and vice versa. Thus the carriage, and with it the cord guiding arm, are moved in one direction or the other according to which screw shaft is engaged by the threaded recesses of the sliding block, and the laying of the cord upon the shuttle or reel correspondingly controlled.

For the purpose of shifting the sliding block at each extremity of the movement of the carriage I provide a trigger arm 101 pivoted to the member 96 and having a pair of laterally extending spaced lugs 101ª and 101ᵇ adapted to alternately engage a projection 100ª. A rod or bar 102 supported by suitable ears 97ᵇ on the casting 97 carries a pair of adjustable stops 103, which may be clamped in any desired position by means of screws 103ª. These stops are designed to be contacted with and shift the trigger arm 101 as the carriage nears the limit of its movement in either direction, such limit of movement being determined by the adjustment of the stops. A helical spring 104 connected respectively to a pin on the trigger arm and a similar pin on the casting 95ᵇ serves to hold said arm pressed to the limit of its movement in either direction and hence the half nut block 100 pressed into engagement with the corresponding screw rod.

Said spring also serves to secure a more rapid shifting of the block 100 for it will be seen that as the trigger arm is swung by one of the stops this movement will be against the tension of the spring until the dead center is passed, whereupon the spring will throw the trigger arm immediately to the limit of its movement in the opposite direction, throwing the block quickly into engagement with the other screw shaft and reversing the movement of the carriage.

As hereinbefore stated, the cord guiding mechanism is mounted on the hinged part of the shuttle frame or raceway so as to bring it into the best position for accurately guiding the cord to the reel. In order that the opening of the said hinged portion of the shuttle frame may not interfere with the driving connections I use chain and sprocket driving connections, certain of the sprocket wheels rotating on an axis coincident with the pivotal axis of the said hinged section.

This I have found can be conveniently effected by making the hinge pintle 62 in the shape of a hollow shaft (Fig. 9) within which is journaled a shaft 105 which receives power from the main shaft 48 and transmits it to the screw shafts through suitable gearing. Said shaft 105 therefore carries fast on one end thereof a sprocket wheel 106 over which passes a chain 107, which also engages with the teeth of a sprocket 108 fast on the main shaft 48. These sprockets and the connecting chain are preferably inclosed in a chain guard 109. A sprocket chain 110 passes around a sprocket wheel 111, fast on the opposite end of shaft 105 and also around a sprocket wheel 112, fast on the screw shaft 98$^a$. These sprockets and chain are inclosed in a chain guard 113, provided with a cover 114, and which chain guard is pivotally mounted on the hinged pintle 62 and is rigidly secured to the hinged portion of the shuttle or reel frame. A bracket 115 is pivotally mounted on the end portion of hinged pintle 62 on the same side as sprocket 106 and is formed at its upper extremity into a gear casing and the slide casting or member 97 is rigidly fastened to the chain guard 113 at one end and has its opposite end fashioned to serve as a cover 115$^a$ for the gear casing or bracket 115, this gear casing 115 and cover 115$^a$ inclosing the gears 99 and 99$^a$.

In order to feed the cord to the cord guide in a proper manner and under the requisite tension I lead it from a cord supply spool 116, over guide rollers 117 and 118 mounted respectively on the long and short arms of a rocking lever 119 fast on a shaft 120 journaled at the upper end of a bracket 121 supported from the frame of the machine. For supporting the spool 116 I provide a pair of rearwardly extending brackets 122 and 122$^a$ formed at their extremities with bosses for the reception of a horizontal rod 123 and having also arcuate or curved bearing portions provided with linings of friction material indicated at 122$^b$ held in place by set screws, as shown. The rod 123 is provided at one end with an arm 124 pinned thereon, which arm is provided with a bearing boss 124$^x$, in which is rotatably mounted a stub shaft 125 carrying a brake drum 126 in proximity to the friction pad and being also provided with spring dogs 127 designed to frictionally engage the hollow bore of the spool. A second arm 124$^a$ similarly provided with a stub having a brake drum and driving dogs is slidably keyed upon the opposite end of the rod 123. The arm 124 is provided with a handle 124$^b$ by means of which rod 123 and both arms may be rocked to raise the friction drums from engagement with the friction shoes, and also arm 124 may be moved away from and toward arm 124$^a$ to permit the removal and replacement of the spool.

A rod 122$^x$ is carried by bracket 122 and the handle 124$^b$ may be thrown back until it contacts with this rod 122$^x$ which serves as a stop to limit the movement of the arm 124$^b$ and hold the arms 124, 124$^a$ in convenient position for removal and replacement of the spool.

As the cord passes upwardly from the drum over rollers 117 and 118 before passing to the reeling mechanism any increased tension operating upon the long arm of the lever 119 will tend to depress it and impart corresponding upward movement to the short arm and roller 117.

I make use of this tendency to rock with the lever 119 under increased tension to secure a sensitive regulation of the tension by following connections.

I provide the shaft 120 with an arm 120$^a$, which is connected by a spring 128 with a lug 121$^a$ on the bracket or standard 121 through adjusting means, such as a screw threaded rod 129 and nut 130. Said shaft also carries a bifurcated arm 120$^b$ bearing set screws $b$ designed to contact alternately with an abutment 121$^b$ carried by the standard for limiting the rocking movement of the lever 119.

The arm 120$^a$ is connected by a rod 130 through the interposition of oppositely placed springs 131 and 132 confined in position by nuts 131$^a$ and 131$^b$ with an arm 133 pivotally mounted on the shaft 123. Arm 124$^a$ has a projection 124$^y$ overlying the arm 133 and provided with an adjusting stop screw $y$ bearing on said arm 133.

Any increase in the tension of the winding material will rock the lever 119 in a counter-clockwise direction, and this action through the connecting rod 130 and its spring connection with arm 133 will rock the latter, which in turn acting through adjustable contact $y$ will raise the arm 124$^a$ and with it arm 124, which will lift the brake drums from their friction pads and immediately relieve the increased tension.

Upon the tension being relieved the reverse action will take place.

As before stated it is necessary that the pointers or indicators 74 and 75 shall be in alinement before the raceway and reel or shuttle sections can be opened to permit removal of the core.

Figure 2:
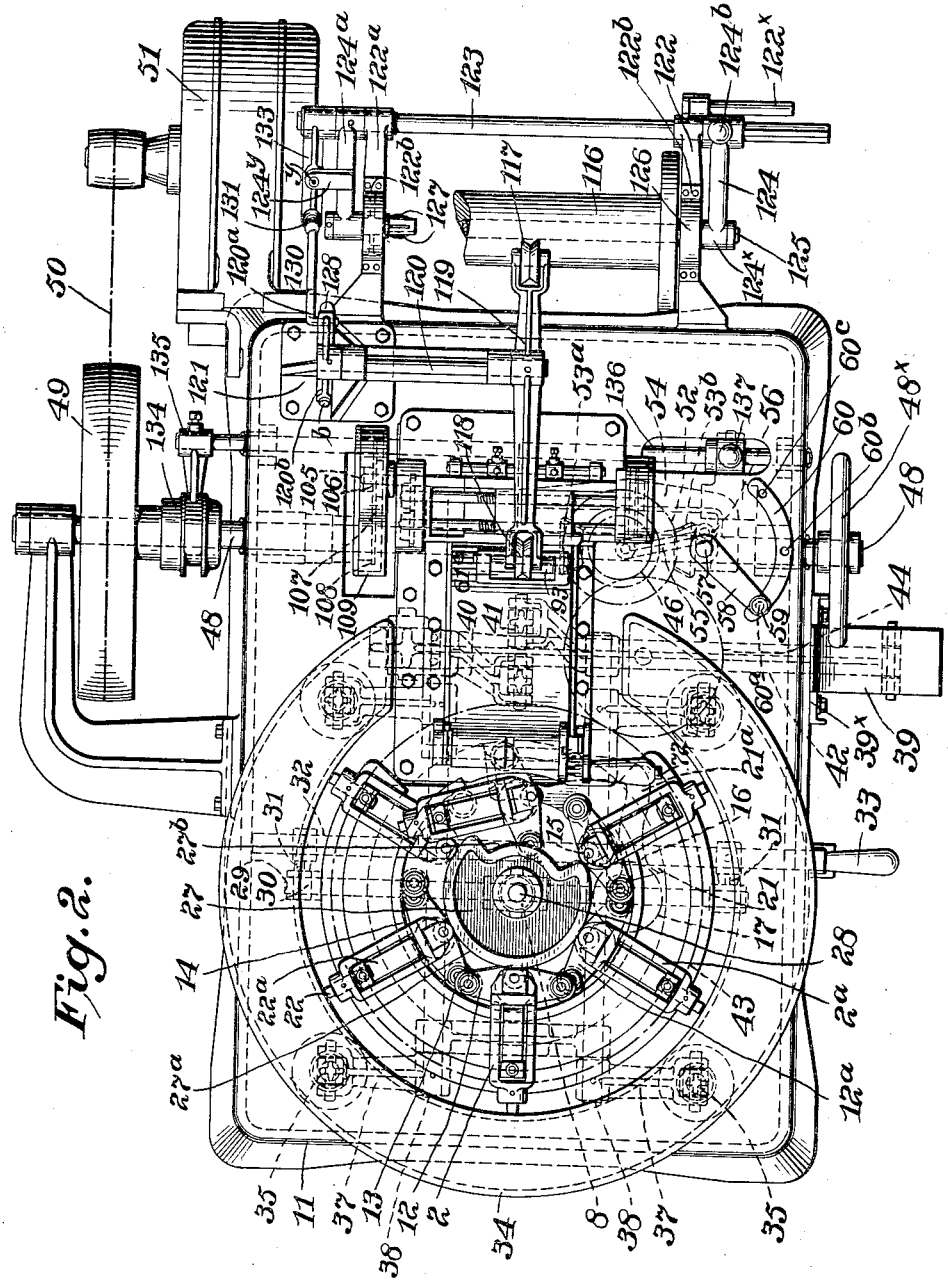
Fig. 2 is a plan view.
Figure 3:
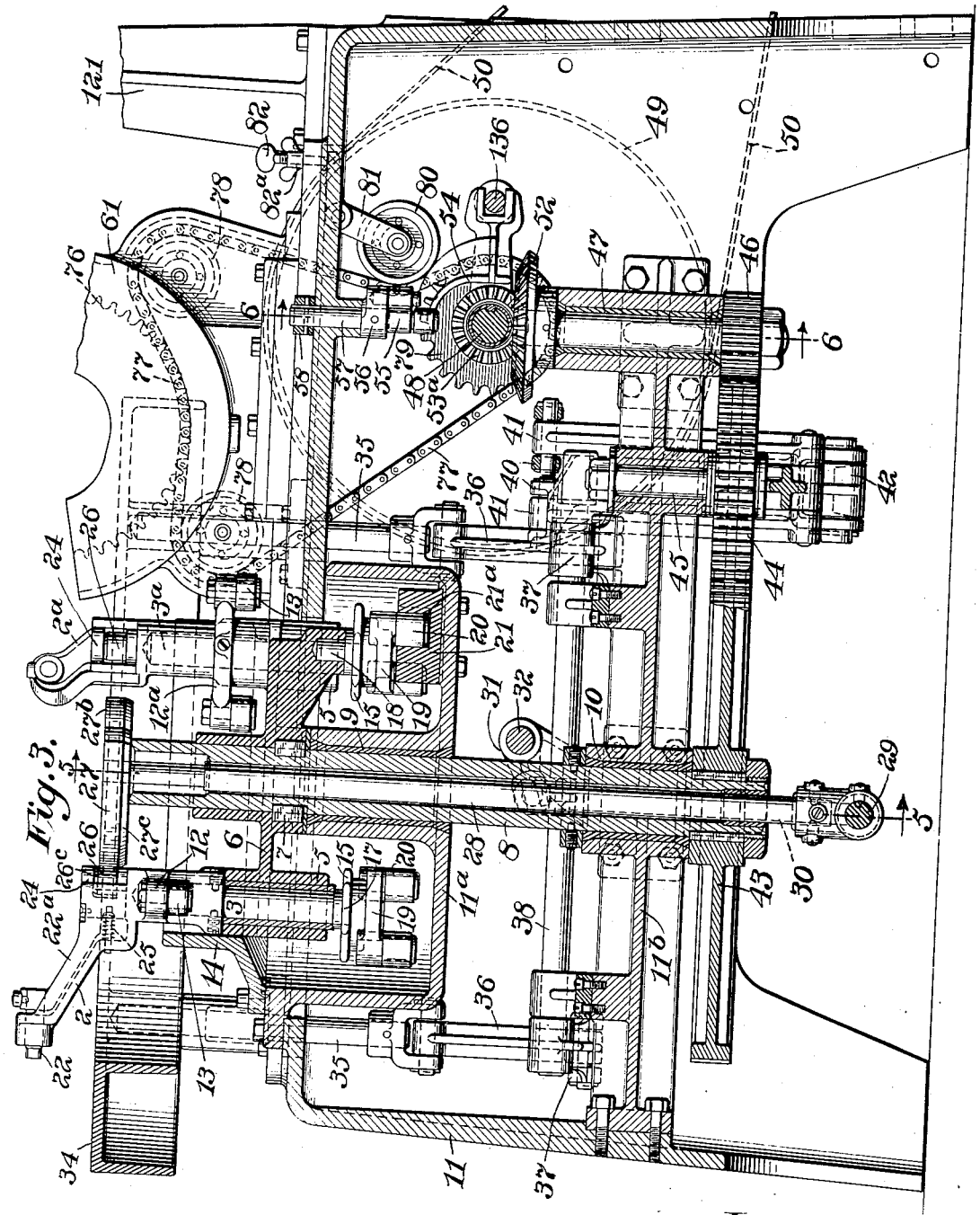
Fig. 3 is a central vertical longitudinal section.
Figure 4:
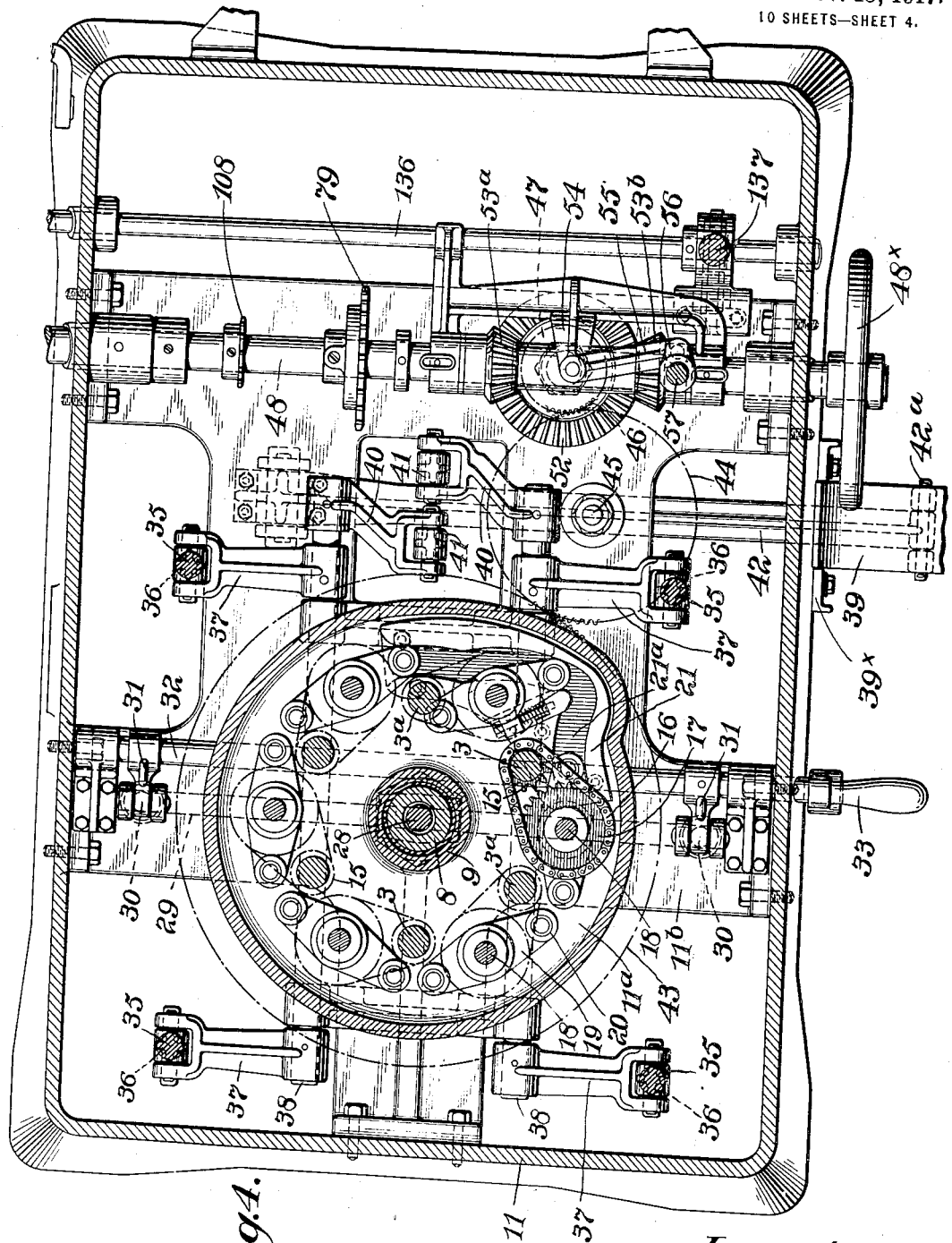
Fig. 4 is a horizontal section on line 4—4 of Fig. 1.
Figure 6:
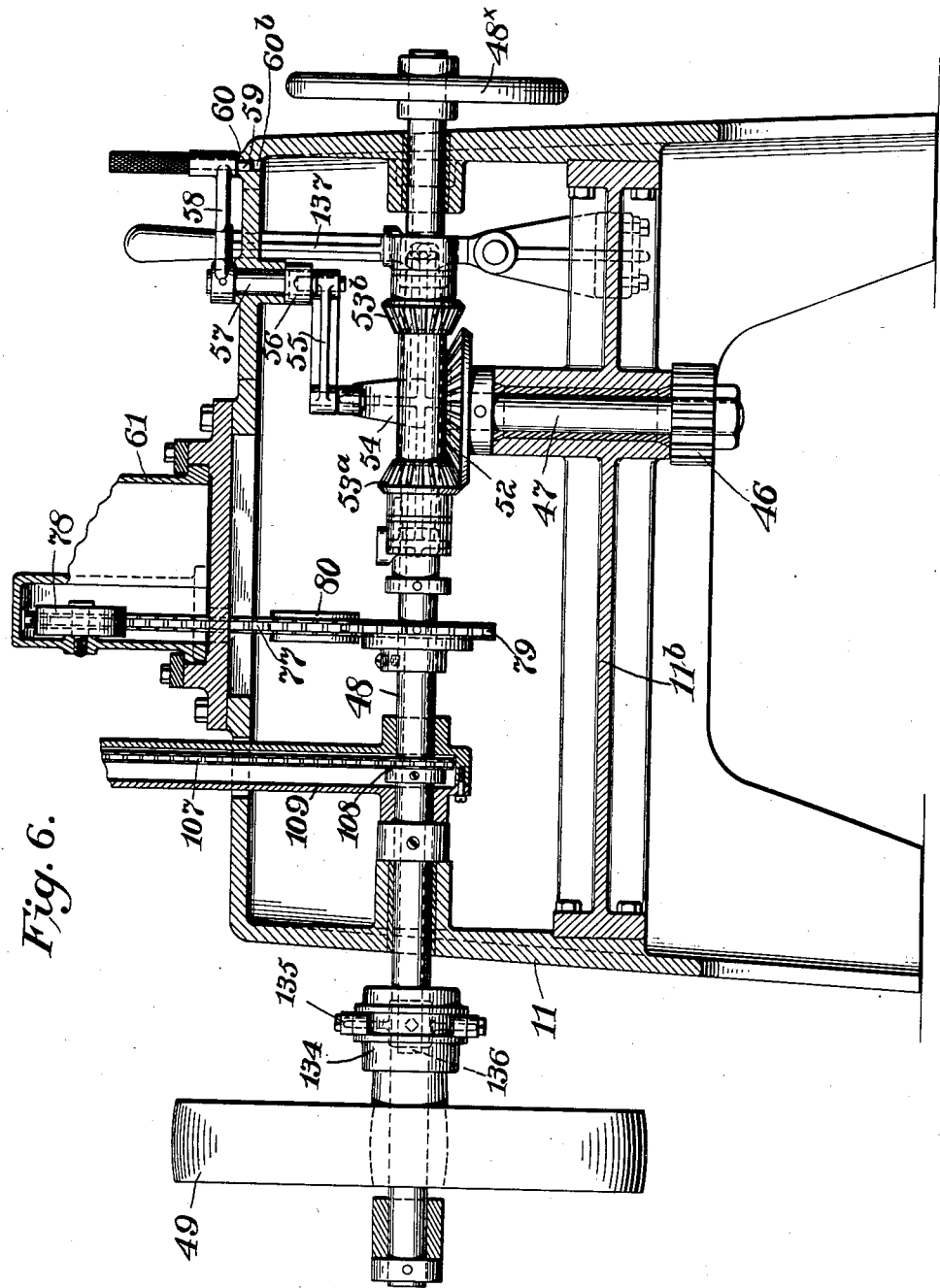
Fig. 6 is a similar view on line 6—6 of Fig. 3.

To enable this to be conveniently effected in case the machine does not come to a stop at the completion of a winding operation with the said pointers in alinement I provide a suitable clutch between the shaft 48 and drive pulley 49, which clutch is conventionally indicated at 134. This clutch is operated by a clutch arm 135 fast on a shaft 136, slidably mounted in the machine frame and operated by a pivoted lever 137 suitably connected thereto and having a handle portion within convenient reach of the operator, as clearly indicated in Figs. 1 and 2. Shaft 48 projects through the front of the machine frame where it is provided with a hand wheel 48ˣ.

The apparatus having been disconnected from the drive pulley 49 by the clutch and operating mechanism just described the operator can by the hand wheel 48 easily turn the reel or shuttle until its pointer 74 is brought into proper position with relation to the pointer 75.

What I claim is:

1. In combination, a ring core, a plurality of core holding and driving arms adapted to revolve in a horizontal plane, a plurality of core engaging devices carried by said arms, means for simultaneously operating said core engaging devices to engage or release the core, and a vertically movable core support for sustaining the core during such engagement and disengagement.

2. In combination, a ring core, a plurality of core holding and driving arms adapted to revolve in a horizontal plane, a plurality of core engaging devices carried by said arms, means for simultaneously operating said core engaging devices to engage or release the core, and a vertically movable core support for sustaining the core during such engagement and disengagement, and means for locking said support in core sustaining position.

3. In combination, a ring core, a plurality of core holding and driving arms adapted to revolve in a horizontal plane, a plurality of core engaging devices carried by said arms, means for simultaneously operating said core engaging devices to engage or release the core, and a vertically movable core support for sustaining the core during such engagement and disengagement, a lever for operating said core support, and means for locking said lever in position to hold said support elevated.

4. In combination, a ring core, a plurality of core holding and driving arms adapted to revolve in a horizontal plane, a plurality of core engaging devices carried by said arms, means for simultaneously operating said core engaging devices to engage or release the core, and a vertically movable core support for sustaining the core during such engagement and disengagement, a lever for operating said core support, and means for locking said lever in position to hold said support elevated, a treadle lever connected to said core support, a spring pressed treadle plate on said lever, and an adjustable plate on the machine frame having a locking incline or shoulder coöperating with said treadle plate.

5. In combination, a ring core, a plurality of circularly arranged supporting and driving arms, a plurality of core engaging devices yieldably carried by said arms, a single cam normally held stationary and normally holding said core engaging devices in engaging position and having a peripheral edge for successively releasing said core engaging devices, and means for bodily moving said cam to free its edge from all said devices.

6. In combination, a ring core, a plurality of radially arranged supporting and driving arms, core engaging devices movably carried by said arms, springs tending normally to draw said devices out of engagement with the core, a single cam normally held stationary and having a peripheral edge adapted to effect successive disengagement and reëngagement of said devices with the core, and means for shifting said cam axially with relation to said driving arms.

7. In combination, a ring core, a plurality of radially arranged core driving arms arranged to support and revolve the same, core engaging devices movably carried by said arms, winding means encircling said core, means for automatically swinging said arms successively to clear the winding means, and means for moving said core engaging devices to disengage the arms from the core before said arms begin their swinging movement.

8. In combination, a ring core, winding means encircling the same, a revolving carrier, a plurality of shafts journaled in said carrier parallel with the axis thereof, core driving arms carried by said shafts, a circular wall encircling said carrier and having an interruption in proximity to the winding means, means carried by said shafts and coacting with said circular wall to hold the arms in core driving position, and cam means for swinging said arms when they reach the interruption in said wall.

9. In combination, a ring core, winding means encircling the same, a revolving carrier, a plurality of annularly disposed shafts journaled in said carrier, core driving arms carried by said shafts, a wall concentric with said carrier and having a gap adjacent said winding means, cross arms on said shafts, rollers on said cross arms engaging said wall, a cam adjacent the winding means, and means connected with said shafts for coöperating with said cam.

10. In combination, a ring core, winding means encircling the same at a fixed point, a hollow shaft with means for driving the same, a plurality of core driving arms supported from said hollow shaft, means for causing said arms to successively clear said winding means, core engaging devices carried by said arms, a cam disk coöperating with said core engaging devices, and a lever having connections extending through said hollow shaft for bodily shifting said cam disk.

11. In combination, a ring core, winding means encircling the same at a fixed point, a plurality of swinging revolving core supporting and driving arms, means for swinging said arms to successively clear said winding means, radially movable, spring pressed core engaging devices carried by said arms, a cam disk having a peripheral edge coöperating with said core engaging devices, and means for shifting said cam disk axially of the core.

12. In combination a ring core, winding means encircling the same at a fixed point, a plurality of revolving core supporting and driving arms, means for causing said arms to successively clear said winding means, spring pressed core engaging devices carried by said arms, a cam disk having a peripheral cam face for coöperating with said core engaging devices, and having an inclined face adjacent said peripheral cam face, and means for shifting said cam bodily axially of the core.

13. In combination, a ring core, a rotary element, core supporting and driving arms carried by said element, spring pressed slides carried by said element, core engaging means carried by said slides, a cam disk having a peripheral face coacting with said slides and having an inclined face adjoining said peripheral face, and means for producing a relative axial movement between said cam disk and rotary element.

14. In combination, a ring core, winding means encircling the same at a fixed point, a rotary carrier, a plurality of annularly arranged rotatable shafts journaled in said carrier parallel with the axis thereof, core supporting and driving arms carried by said shafts, an arc shaped member concentric with said carrier, arms on said shafts, and rollers on said arms coöperating with said arc shaped member.

15. In combination, a ring core, winding means encircling the same at a fixed point, a rotary carrier, a plurality of annularly arranged shafts journaled in said carrier, core driving arms carried by said shafts, an arc-shaped wall concentric with said rotary carrier, and cross arms on said shafts, each of said cross arms having a pair of rollers cooperating with said wall.

16. In combination, a ring core, winding means encircling the same at a fixed point, a rotary carrier, a plurality of annularly arranged shafts journaled in said carrier, core driving arms carried by said shafts, an arc-shaped wall concentric with said rotary carrier, and cross arms on said shafts, each of said cross arms having a pair of rollers coöperating with said wall, said cross arms and rollers on alternate shafts being arranged out of line with each other.

17. In combination, a ring core, winding means encircling the same at a fixed point, a rotary carrier, a plurality of annularly arranged rotatable shafts journaled in said carrier parallel with the axis thereof, core supporting and driving arms carried by said shafts, an arc-shaped wall concentric with the axis of said carrier, arm positioning means carried by said shafts and coöperating with said arc-shaped wall, a fixed cam device adjacent the winding means, arms supported from said carrier having parts adapted to coöperate with said cam device, and operating connections between said last named arms and shafts.

18. In combination, a ring core, winding means encircling the same at a fixed point, a rotary carrier, a plurality of annularly disposed parallel shafts journaled in said carrier, core supporting and driving arms carried by said shafts, an arc-shaped wall concentric with the axis of said carrier, contact means carried by the shafts for coacting with said wall to prevent swinging of the arms, means for rotating said shafts to swing the arms when said contact means is clear of said wall, core engaging devices slidably carried by said arms, and a nonrotatable cam for coöperating with said core engaging devices.

19. In combination, a ring core, winding means encircling the same at a fixed point, a rotatable carrier, a plurality of annularly arranged shafts journaled in said carrier and projecting above and below the same, an arc-shaped wall encircling the shafts above said carrier, upper cross arms connected with said shafts carrying rollers adapted to coact with said arc-shaped wall, core supporting and driving arms carried by the upper ends of said shafts, stub shafts projecting from the lower side of said carrier, lower cross arms on said stub shafts, rollers carried by said lower cross arms, a cam for coöperating with said rollers to rotate said lower cross arms, and gearing for transmitting the rotation of said lower cross arms to said annular shafts.

20. In a cord winding machine, an annular raceway, an annular reel or shuttle rotatably mounted within said raceway and having a laterally elongated opening for the passage of the winding cord, a plurality of spools carried by said shuttle over which the cord passes, a cord guide in proximity to said opening, and means for imparting an oscillating movement to said core guide.

21. In a cord winding machine, an annular raceway, an annular reel or shuttle rotatably mounted within said raceway, a slide carried by said raceway to oscillate circumferentially thereof, a cord guide carried by said slide, means for rotating the shuttle, and means for causing the rotary movement of the shuttle to oscillate said slide.

22. In a cord winding machine, an annular raceway, an annular reel or shuttle rotatably mounted within said raceway, a plurality of spools carried by said shuttle, a slide carried by said raceway to oscillate circumferentially thereof, a cord guide carried by said slide, means for rotating the shuttle, and means for causing the rotary movement of the shuttle to oscillate said slide.

23. In a cord winding machine, an annular raceway, an annular reel or shuttle rotatably mounted within said raceway, a plurality of spools carried by said shuttle, a slide carried by said raceway to oscillate circumferentially thereof, a roller carried by said slide over which the cord is led from said spools, and means for oscillating the slide as the shuttle rotates.

24. In a cord winding machine, an annular raceway, an annular reel or shuttle rotatably mounted therein, a cord guide within the shuttle to oscillate circumferentially thereof, a rocking member carried by the shuttle, connections whereby said rocking member oscillates said cord guide, and cam means on the raceway for operating said rocking member.

25. In a cord winding machine, an annular raceway, an annular reel or shuttle rotatably carried thereby, a slide carried by said reel to move circumferentially thereof, a rack carried by said slide, a shaft rotatably carried by the reel and carrying a gear meshing with said rack, and means to oscillate said shaft as the reel rotates.

26. In a cord winding machine, an annular raceway, an annular reel or shuttle rotatably carried thereby, a slide carried by said reel to move circumferentially thereof, a rack carried by said slide, a shaft rotatably carried by the reel and carrying a gear meshing with said rack, a second gear carried by said shaft, a gear segment pivotally supported from the reel and meshing with said second gear, and cam means supported from the raceway for oscillating said gear segment.

27. In a cord winding machine, an annular raceway, an annular reel or shuttle rotatably carried thereby, a slide carried by said reel to move circumferentially thereof, a rack carried by said slide, a shaft rotatably carried by the reel and carrying a gear meshing with said rack, a second gear carried by said shaft, a gear segment pivotally supported from the reel and meshing with said second gear, a roller carried by said gear segment, and an annular cam supported from the raceway with which said roller coacts.

28. In a winding machine, an annular raceway comprising a fixed section and a section hinged thereto, a sectional reel rotatably mounted within said raceway, a spring tending to open said hinged section of the raceway, a latch arm pivoted to the hinged section and adapted to engage a part on the rigid section, and means for swinging said latch arm and also imparting lengthwise movement thereto.

29. In a winding machine, an annular raceway comprising a fixed section and a section hinged thereto, a sectional reel rotatably mounted within said raceway, a pair of latch arms pivoted to the hinged section on opposite sides thereof and adapted to engage parts on the rigid section, and a single controlling arm arranged to swing said latch arms and also impart lengthwise movement thereto.

30. In a winding machine, an annular raceway comprising a fixed section and a section hinged thereto, a sectional reel rotatably mounted within said raceway, a spring tending to open said hinged section of the raceway, an eccentric shaft rotatably mounted on one of the sections, a latch arm pivotally supported from said shaft and adapted to lockingly engage the other section, a spring tending to draw said latch arm into locking position, a handle arm secured to said eccentric shaft, and means carried by said arm for swinging the latch arm against the tension of its spring.

31. In a winding machine, an annular raceway, comprising a fixed section and a section hinged thereto, a sectional reel rotatably mounted within said raceway, an eccentric shaft rotatably mounted on one of the sections, a pair of latch arms pivotally supported from opposite ends of said shaft and adapted to lockingly engage the other section, spring means tending to swing said latch arms into locking position, and means for swinging said shaft.

32. In a winding machine, an annual raceway comprising a fixed section and a section hinged thereto, a sectional reel rotatably mounted within said raceway, a spring tending to open said hinged section of the raceway, an eccentric shaft rotatably mounted on one of the sections, a latch arm pivotally supported from said shaft and adapted to lockingly engage the other section, a spring tending draw said latch arm into locking position, a handle arm secured to said eccentric shaft, and means carried by said arm for swinging the latch arm against the tension of its spring, and means for locking said handle arm against movement.

33. In a winding machine, an annular raceway, an annular reel rotatably mounted therein, a plurality of annularly arranged spools carried by said reel, said raceway having a laterally elongated opening, a thread guide located in proximity to said opening, and means for imparting a transverse reciprocating movement thereto as the reel rotates.

34. In a winding machine, an annular raceway, an annular reel rotatably mounted therein, a plurality of annularly arranged spools carried by said reel, a thread guide, and means for reciprocating the same parallel with the axis of the reel comprising a slidable carriage to which said guide is connected, a pair of parallel rotating screws, and means for alternately automatically connecting said carriage to said screws.

35. In a winding machine, an annular raceway comprising a stationary part and a hinged section, an annular sectional reel or shuttle rotatably mounted within said raceway, cord guiding means carried by the hinged section of the raceway, including a laterally movable cord guiding member, and flexible connections from a moving element carried by a stationary part of the machine for operating said movable cord guiding member.

36. In a winding machine, an annular raceway comprising a stationary part and a hinged section, a hollow pintle forming the hinge for said section, a sectional reel or shuttle rotatably mounted within said raceway, cord guiding means supported from said hinged section, a shaft rotatably mounted within said hollow pintle, means for driving said shaft, and means for transmitting motion from said shaft to said movable cord guiding means.

In testimony whereof I affix my signature.

JOHN ORVILLE GOODWIN.